US008890928B2

(12) United States Patent
Zeng

(10) Patent No.: US 8,890,928 B2
(45) Date of Patent: Nov. 18, 2014

(54) METHOD, SYSTEM AND DEVICE FOR CONFERENCE SWITCHING

(71) Applicant: Huawei Device Co., Ltd., Guangdong (CN)

(72) Inventor: Jianhong Zeng, Shenzhen (CN)

(73) Assignee: Huawei Device Co., Ltd., Shenzhen (CN)

(*) Notice: Subject to any disclaimer, the term of this patent is extended or adjusted under 35 U.S.C. 154(b) by 111 days.

(21) Appl. No.: 13/707,473

(22) Filed: Dec. 6, 2012

(65) Prior Publication Data

US 2013/0100237 A1 Apr. 25, 2013

Related U.S. Application Data

(63) Continuation of application No. PCT/CN2011/075373, filed on Jun. 7, 2011.

(30) Foreign Application Priority Data

Jun. 29, 2010 (CN) .......................... 2010 1 0212359

(51) Int. Cl.
*H04N 7/14* (2006.01)
*H04N 7/15* (2006.01)
(52) U.S. Cl.
CPC ... *H04N 7/14* (2013.01); *H04N 7/15* (2013.01)
USPC .................. 348/14.08; 348/14.09; 348/14.12
(58) Field of Classification Search
CPC ......... H04N 7/14; H04N 7/141; H04N 7/142; H04N 7/147; H04N 7/149; H04N 7/15; H04N 7/152
USPC ............................................ 348/14.01–14.16
See application file for complete search history.

(56) References Cited

U.S. PATENT DOCUMENTS

2005/0015444 A1* 1/2005 Rambo ......................... 709/204
2005/0259145 A1 11/2005 Schrader et al.
(Continued)

FOREIGN PATENT DOCUMENTS

CN 1581967 A 2/2005
CN 1620133 A 5/2005
(Continued)

OTHER PUBLICATIONS

1st Office Action in corresponding Chinese Patent Application No. 20101021259.7 (Oct. 8, 2012).
(Continued)

*Primary Examiner* — Melur Ramakrishnaiah
(74) *Attorney, Agent, or Firm* — Leydig, Voit & Mayer, Ltd.

(57) ABSTRACT

Embodiments of the present invention provide a method, system and device for conference switching, relating to communications technologies, which solve the technical problem in the prior art that the operation during conference switching is complicated and user experience is poor. The method embodiments of the present invention include: receiving, from a conference terminal, a switching request message requesting switching to a destination conference, where the switching request message includes information of the destination conference; and determining, according to the switching request message, to switch to the destination conference indicated by the information, and performing the process of switching to the destination conference. The embodiments of the present invention are mainly applicable to the field of multimedia communication technologies.

12 Claims, 7 Drawing Sheets

(56) References Cited

U.S. PATENT DOCUMENTS

| | | | |
|---|---|---|---|
| 2006/0233120 A1* | 10/2006 | Eshel et al. | 370/260 |
| 2007/0285503 A1* | 12/2007 | Asthana et al. | 348/14.08 |
| 2008/0019522 A1 | 1/2008 | Proctor | |
| 2011/0019620 A1 | 1/2011 | Wang | |
| 2011/0280128 A1* | 11/2011 | Nakajima | 370/235 |
| 2012/0268549 A1 | 10/2012 | Yang et al. | |

FOREIGN PATENT DOCUMENTS

| | | |
|---|---|---|
| CN | 1934860 A | 3/2007 |
| CN | 101123651 A | 2/2008 |
| CN | 101127622 A | 2/2008 |
| CN | 101159842 A | 4/2008 |
| CN | 101170674 A | 4/2008 |
| CN | 101473577 A | 7/2009 |
| CN | 101515949 A | 8/2009 |
| CN | 101547143 A | 9/2009 |
| CN | 101627576 A | 1/2010 |
| CN | 101778247 A | 7/2010 |
| EP | 2093968 A1 | 8/2009 |
| EP | 2175606 A1 | 4/2010 |
| JP | 2009110473 A | 5/2009 |
| WO | WO 03007607 A1 | 1/2003 |
| WO | WO 03052611 A1 | 6/2003 |

OTHER PUBLICATIONS

Written Opinion of the International Searching Authority in corresponding PCT Patent Application No. PCT/CN2011/075373 (Sep. 15, 2011).

International Search Report in corresponding PCT Patent Application No. PCT/CN2011/075373 (Sep. 15, 2011).

$2^{nd}$ Chinese Office Action in corresponding Chinese Patent Application No. 201010212359.7 (May 14, 2013).

* cited by examiner

MET HOD, SYSTEM AND DEVICE FOR CONFERENCE SWITCHING

CROSS-REFERENCE TO RELATED APPLICATIONS

This application is a continuation of International Patent Application No. PCT/CN2011/075373, filed on Jun. 7, 2011, which claims priority to Chinese Patent Application No. 201010212359.7, filed on Jun. 29, 2010, both of which are hereby incorporated by reference in their entireties.

FIELD OF THE INVENTION

The present invention relates to communications technologies, and in particular, to a method, system and device for conference switching.

BACKGROUND OF THE INVENTION

A video conference is more and more widely used in every field of industries. It is a part of daily work to hold a video conference between companies in different regions and between departments in a company. During the process of a video conference, the following scenario is common: as shown in FIG. 1, a conference terminal 1 originally in conference 1 together with a conference terminal 2 switches from conference 1 to conference 2. This process is called conference switching. A conference terminal corresponds to a conference site. Each conference site involves attendees and conference terminals. Attendees are people who join in the conference. The attendees join in difference video conferences by using their conference terminals, and the conference entering process in each conference is implemented through interaction between a terminal and a multipoint control server, for example, MCU (Multipoint Control Unit).

In the conference switching solution according to the prior art, the conference terminal requesting switching to a conference first shuts down the connection channel of the current conference with the multipoint control server, including: shutting down the signaling of the current conference; shutting down a media channel connecting to the current conference, in which the media channel includes a video channel, an audio channel, and other media channels; quitting the current conference; and then calling a destination conference and opening a corresponding connection channel, including establishing the signaling with the destination conference and opening the media channel to enter the destination conference.

During the process of implementing the above conference switching, the inventor finds that the prior art has at least the following problem:

During conference switching in the prior art, the terminal needs to interrupt the connection channel with the multipoint control server, and re-opens the connection channel to implement the conference switching. In addition, the attendees need to perform complicated operations on the terminal, for example, hanging up a call, redialing numbers, and calling to enter the conference. Therefore, the switching speed is low. Further, the remote image of the current conference must be interrupted, and consequently the entire conference switching process is complicated and not friendly.

SUMMARY OF THE INVENTION

Various embodiments of the present invention provide a method, system and device for conference switching, which simplifies the process of conference switching and improves user experience.

To achieve the above objective, various embodiments of the present invention provide the technical solutions as follows:

A method for conference switching includes:

receiving from a conference terminal a switching request message requesting switching to a destination conference, where the switching request message includes information of the destination conference; and determining to switch to the destination conference indicated by the information according to the switching request message, and performing the process of switching to the destination conference.

A method for conference switching includes:

sending, to a multipoint control server, a switching message for conference switching, and receiving a switching indication message from the multipoint control server; where the switching indication message indicates whether the multipoint control server successfully performs the process of switching to the conference; and switching to the conference according to the switching indication message and under a collaboration with the multipoint control server.

A multipoint control server includes:

a request receiving unit, configured to receive from a conference terminal a switching request message requesting switching to a destination conference, where the switching request message includes information of the destination conference; and a switching processing unit, configured to determine to switch to the destination conference indicated by the information according to the switching request message, and perform the process of switching to the destination conference;

A conference terminal includes:

a sending unit, configured to send, to a multipoint control server, a switching message for conference switching;

a receiving unit, configured to receive a switching indication message from the multipoint control server, where the switching indication message indicates whether the multipoint control server successfully performs the process of switching to the conference; and a collaboratively performing unit, configured to switch to the conference according to the switching indication message and under a collaboration with the multipoint control server.

A system for conference switching includes:

a conference terminal, configured to send, to a multipoint control server, a switching message for conference switching;

a multipoint control server, configured to: when a received switching message is a switching request message used for switching to the destination conference, determine, according to the information of the destination conference included in the switching request message, to switch to a destination conference indicated by the information, and perform the process of switching to the destination conference.

The technical solution of the present invention produces the following beneficial effects: the conference terminal may start the conference switching process by sending the switching request message. Therefore, the process is simple, the connection channel, including the video channel, audio channel, and other media channels, of the original conference does not need to be interrupted, and the remote image of the original conference do not need to be interrupted. This reduces the recalling process during the conference switching and improves the switching speed, achieving smooth conference switching, i.e., switching to the remote image of the destination conference while maintaining the remote image of the original conference uninterrupted, and providing good user experience for users during the conference switching.

BRIEF DESCRIPTION OF THE DRAWINGS

For a clearer description of the technical solutions of the present invention or the prior art, the accompanying drawings for illustrating the embodiments of the present invention or the prior art are briefly introduced below. Apparently, such drawings are for the exemplary purpose only, and persons skilled in the art may derive other drawings from such drawings without creative efforts.

DETAILED DESCRIPTION OF THE EMBODIMENTS

The technical solution disclosed in embodiments of the present invention is described below with reference to embodiments and accompanying drawings. Evidently, the embodiments are exemplary only. Persons skilled in the art may derive other embodiments from the embodiments given here without making creative efforts, and all such embodiments are covered in the protection scope of the present invention.

Embodiment 1

Figure 1:
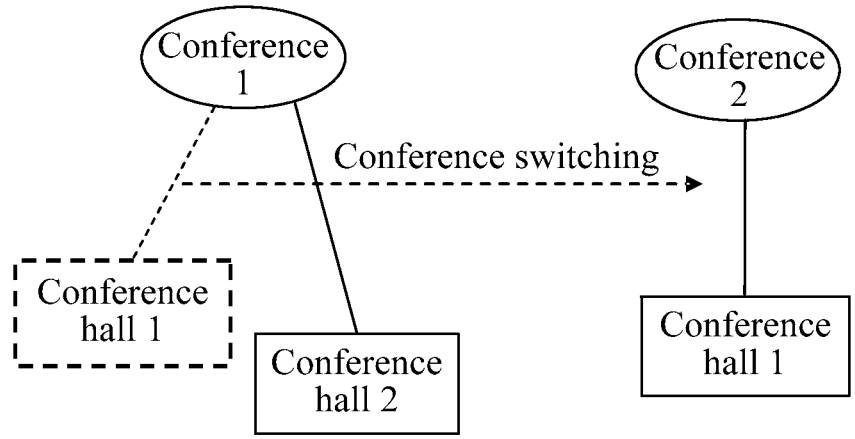
FIG. 1 is a schematic diagram of a scenario of conference switching in the background art.
Figure 2:
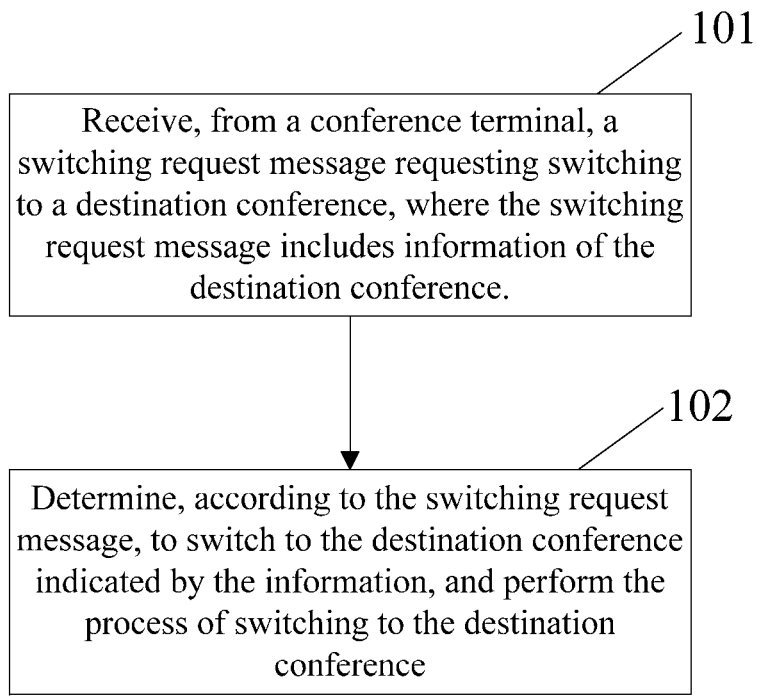
FIG. 2 is a flowchart of a method for conference switching according to Embodiment 1 of the present invention.

An embodiment of the present invention provides a method for conference switching. The method applies to a control side in a video conference. As shown in FIG. 2, the method includes:

Step 101: Receive, from a conference terminal, a switching request message requesting switching to a destination conference, where the switching request message includes information of the destination conference.

The information of the destination conference may be the ID of destination conference.

Preferably, the request message may also include switching request type information and switching verification information. The switching request type information indicates the type of switching desired by the conference terminal, for example, disconnecting from an original conference or maintaining a connection with the original conference. The switching verification information is used to verify the permission of the conference terminal initiating a conference switching request, so as to ensure user security.

Further, preferably, the control side may also send a switching response message after receiving the switching request message, so as to ensure reliability of information exchange between the conference terminal and the control side.

Step 102: Determine, according to the switching request message, to switch to the destination conference indicated by the information, and perform the process of switching to the destination conference.

The method according to the embodiments of the present invention has the following beneficial effects: simplifying the process of conference switching, maintaining a connection channel with the conference terminal, achieves smooth switching of conference images, and improves user experience in conference switching.

Embodiment 2

Figure 3:
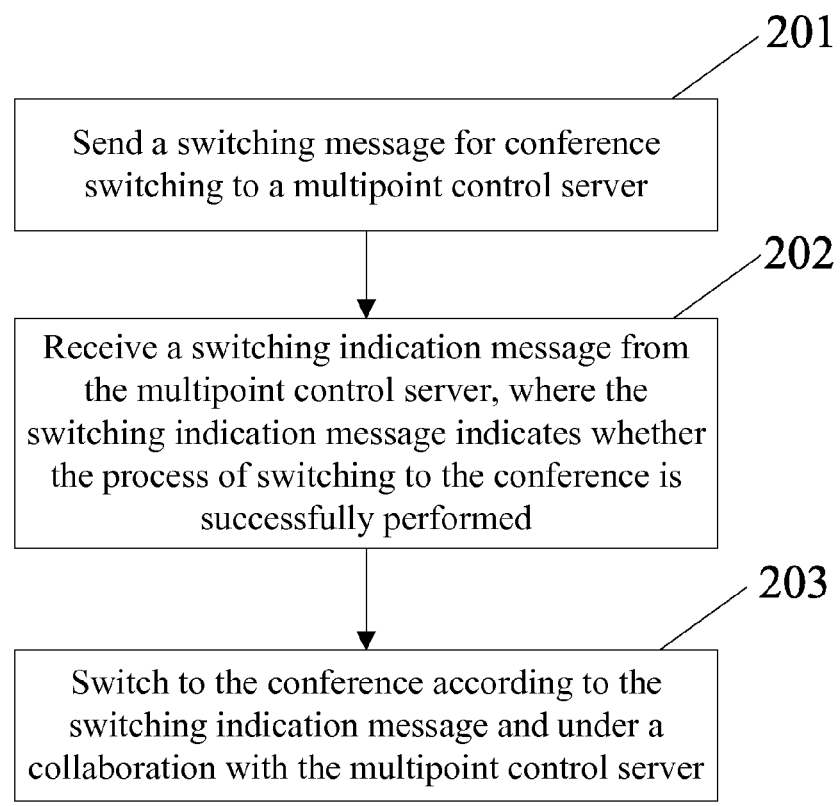
FIG. 3 is a flowchart of a method for conference switching according to Embodiment 2 of the present invention.

This embodiment provides a method for conference switching. The method is applicable to a conference terminal side, and can be deployed on the conference terminal. As shown in FIG. 3, the method includes:

Step 201: Send a switching message for conference switching to a multipoint control server.

When a conference terminal side actively joins in a destination conference, the switching request message for conference switching may be a switching request message requesting switching to the destination conference. In this case, the switching request message includes information of the destination conference. When the conference terminal side in a first conference receives, from the multipoint control server, a switching request message requesting the conference terminal to join in a second conference, the switching message for conference switching may specifically be a switching response message for notifying the multipoint control server whether the multipoint control server agrees to join in the second conference.

Further, when the switching message is a switching request message requesting switching to the destination conference, preferentially the message may also include switching request type information and switching verification information.

In this embodiment, the information of the destination conference may be the ID of the destination conference. This embodiment is specific to a scenario where a conference terminal is to switch to another conference site.

Step 202: Receive a switching indication message from the multipoint control server, where the switching indication message indicates whether the process of switching to the conference is successfully performed.

During the specific implementation, the process of switching to the conference may include multiple items. Therefore, it may be set that when the processing of any item fails, the switching indication message indicates that the process of switching to the conference fails; and when the processing of all items is successful, the switching indication message indicates that the process of switching to the conference is successful.

Step 203: Switch to the conference according to the switching indication message and under a collaboration with the multipoint control server.

In step 201, if a sent switching message is a switching request message, the conference for switching is specifically the destination conference. In step 201, if the sent switching message is a switching response message, the conference for switching is specifically the second conference.

The method provided in this embodiment simplifying the process of conference switching has the following beneficial effects: the conference terminal side may start a conference switching process by using a switching message such as a switching request message. Therefore, the process is simple, the connection channel of the original conference does not need to be interrupted, and remote images of the original conference do not need to be interrupted. This reduces a recalling process during the conference switching and improves the switching speed, thus realizing that the remote images are maintained uninterrupted during the switching, and providing good experience for users during the conference switching.

Embodiment 3

This embodiment specifically describes a method for conference switching. The method relates to a conference terminal side and a control side. This embodiment mainly describes a scenario where a conference terminal desires to joint in a destination conference and actively initiates a switching process. In this embodiment, the following describes by taking an examples of using a conference terminal T1 as the conference terminal side in this embodiment and using an MCU 1 as a multipoint control server in this embodiment and each of the following embodiments. For ease of description, the conference where T1 is currently in is the current conference, called the original conference, supposing that the original conference is conference 1; and the conference requested by T1 for switching is called the destination conference, supposing that the destination conference is conference 2.

Figure 4:
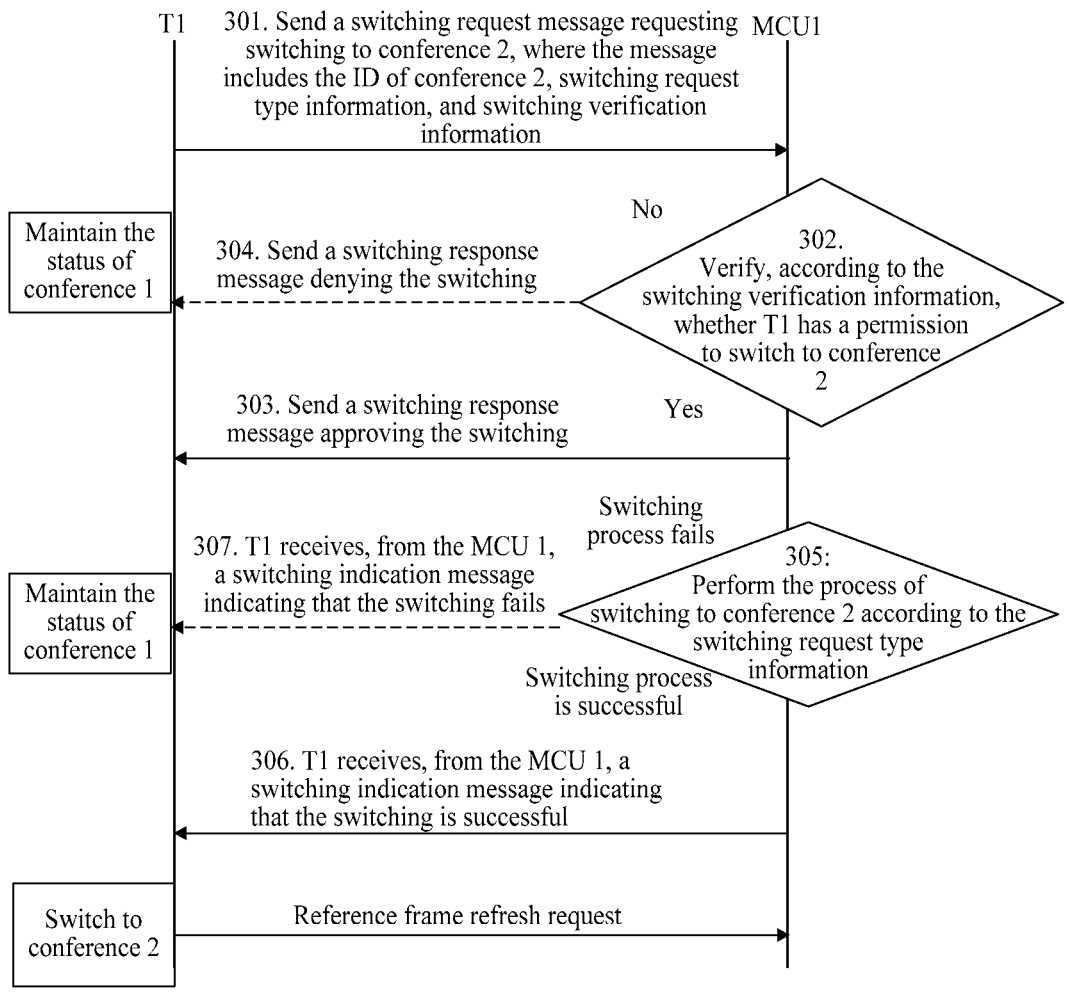
FIG. 4 is a flowchart of a system for conference switching according to Embodiment 3 of the present invention.

It should be noted that the method according to this embodiments is applicable to a scenario where switching is performed between different conferences on a same MCU. That is, the process of the method provided in this embodiment is described under the condition that conference 1 and conference 2 both belong to the MCU 1. As shown in FIG. 4, the method includes the following steps:

When T1 is in conference 1, an attendee desires to join in conference 2 as required. In this case:

Step 301: T1 sends a switching request message requesting switching to conference 2 to an MCU 1, where the switching request message includes at least the ID of conference 2, switching request type information, and switching verification information.

Preferentially, the switching verification information is used to verify the permission of the requesting T1, so as to ensure user security.

Preferentially, the switching request type information indicates the switching type desired by the T1. The switching type may be disconnecting from the original conference after switching and maintaining the connection with the original conference after switching. The processing using different ways is basically as follows: when the switching type indicates disconnecting from the original conference after switching, the information of T1 needs to be updated to the destination conference; when the switching type indicates maintaining the connection with the original conference, it needs to determine whether the original conference is associated with the destination conference; if they are associated, conference switching may be performed by using the resource of the original destination conference; if they are not associated, a new resource needs to be configured for the destination conference and conference switching is performed by using the new resource.

Step 302: The MCU 1 receives the switching request message requesting switching to conference 2, and verify, according to the switching verification information, whether T1 has a permission to switch to conference 2. If a verification result indicates that T1 has the permission to switch to conference 2, step 303 is performed; if a verification result indicates that T1 has the permission to switch to conference 2, step 304 is performed.

The above switching verification information and the process of verifying whether the conference terminal has the permission to switch to conference 2 may be performed in the current way. For example, the switching verification information may include the ID of T1. The MCU 1 may verify, according to the ID of the conference terminal and the ID of conference 2, whether T1 has the permission to switch to conference 2.

Step 303: The MCU 1 sends, to T1, a switching response message approving the switching. T1 receives the switching response message and step 305 is performed.

Step 304: The MCU 1 sends, to T1, a switching response message denying the switching. T1 receives the switching response message and maintains the current status of conference 1. The switching process ends. The subsequent steps do not need to be performed.

Step 305: The MCU 1 performs the process of switching to conference 2 according to the switching request type information. If performing the switching process successfully, the MCU 1 sends, to T1, a switching indication message indicating that the switching is successful, and step 306 is performed; if failing to perform the switching process, the MCU 1 sends, to T1, a switching indication message indicating that the switching fails, and step 307 is performed.

In step 305, the switching request type information may indicate disconnecting from the original conference (conference 2) after switching or maintaining the connection with conference 2 after switching.

When the switching request type information indicates disconnecting from conference 1 after switching, an original media channel can be maintained and used for interaction with conference 2. Therefore, the above process of switching to conference 2 according to the switching request type information includes at least the following items:

The MCU 1 applies for a new conference site ID for T1 in conference 2. The conference site ID may be an MT number or other IDs.

The MCU 1 adds information of T1 in conference 2, including the media protocol supported by T1, audio and video formats, and port information.

The MCU 1 updates media streams of the original conference to media streams of conference 2, and updates the conference information of conference 1 after updating the media streams successfully, for example, refreshing the status of the conference, i.e., not in conference 1. The media streams are bit streams formed of audio streams, video streams, and some control signaling.

If the preceding items are processed successfully, the switching of the MCU 1 is considered successful. The MCU 1 sends, to T1, a switching indication message indicating that the switching is successful, the conference site ID that is newly applied is added to the switching indication message to be sent so as to notify T1, and step 306 is performed. If the processing of any of the preceding items fails, the switching of the MCU 1 is considered failed. A switching response message denying the switching is sent to T1 and step 307 is performed.

When the switching indication message indicates maintaining the connection with conference 1 after switching, a new media channel needs to be established for interaction with conference 2. Therefore, the process of switching to conference 2 according to the switching request type information includes:

The MCU 1 searches for conference 2 in a record of active conferences corresponding to T1.

If conference 2 is searched out, a connection is still maintained between T1 and conference 2. That is, a media channel for transmitting media streams of conference 2 is already available. Therefore, no new media channel needs to be established for conference 2. The MCU 1 may perform the process of switching to the destination conference according to the searched-out resource of the destination conference (the resource refers to the media channel and conference ID). Specifically, the MCU 1 needs to perform at least the following processes:

The MCU 1 searches for the conference site ID in the conference 2.

The MCU 1 updates media streams sent to T1 to media streams of conference 2, and updates the conference information of conference 1 after updating the media streams successfully, for example, refreshing the status of the new conference, i.e., not in conference 1 but maintaining the connection with conference 1.

If the preceding items are processed successfully, the switching of the MCU 1 is considered successful. The MCU 1 sends, to T1, a switching indication message indicating that the switching is successful, a searched-out conference site ID is added to the switching indication message to be sent so as to notify T1, and step 306 is performed. If the processing of any of the preceding items fails, the switching of the MCU 1 is considered failed. A switching response message denying the switching is sent to T1 and step 307 is performed.

If conference 2 is not searched out, a resource needs to be configured for the destination conference, and the process of switching to the destination conference is performed according to the configured resource of the destination conference. If conference 2 is not searched out, T1 is not connected to conference 2. Therefore, a new media channel for conference 2 needs to established (including: a video channel, an audio channel, and other media channels) for transmitting the media streams of conference 2. Specifically, the MCU 1 needs to perform at least the following processes:

The MCU 1 applies for a new conference site ID for T1. The conference site ID may be an MT number or other IDs.

The MCU 1 adds information of T1 in conference 2, including the media protocol supported by T1, audio and video formats, and port information.

The MCU 1 establishes a media channel for conference 2, and transmits the media streams to conference 2 through the established media channel. After the media streams are successfully transmitted, the MCU 1 updates the conference information of conference 2, for example, refreshing the status of the new conference site, i.e., not in conference 1 but maintaining the connection with conference 1.

If the preceding processes are processed successfully, the switching of the MCU 1 is considered successful. The MCU 1 sends, to T1, a switching indication message indicating that the switching is successful, the conference site ID that is newly applied is added to the switching indication message to be sent so as to notify T1, and step 306 is performed. If the any of the preceding processes fails, the switching of the MCU 1 is considered failed. A switching response message denying the switching is sent to T1 and step 307 is performed.

In the switching request type information indicating maintaining the connection with conference 1 after switching, after the switching is successful, T1 uses a new media channel as a main channel for transmitting media, local sound and images, to conference 2. The sound and images in conference 2 are also transmitted to T1 through the new channel. The main view on T1 displays images of conference 2. In addition, the original media channel is used to receive the sound and images in conference 1. The images in conference 1 may be viewed on T1 by using an auxiliary image, and the sound in different conferences may be switched to the output of a speaker. Meanwhile, the conference terminal T1 may still send special image information to notify that a connection with conference 1 is still maintained (in case the offline status of T1 is detected in conference 1). However, the local sound and images of the conference terminal T1 are only transmitted to the conference which T1 is currently in, instead of being transmitted to conference 1. When conference 1 needs the conference terminal T1 to join in, the conference terminal T1 switches to join in conference 1 as required at any time. After the switching is completed, the images and sound on the main view are originated from conference 1.

Step 306: T1 receives, from the MCU 1, a switching indication message indicating that the switching is successful, and collaborates with the MCU 1 to switch to conference 2 according to the switching indication message. In this case, the conference switching process can be ended.

The process of switching to conference 2 includes as follows: the conference information is updated, for example, indicating the current conference being conference 2 and the conference site ID of T1 in conference 2; and a reference frame refresh request is sent to the MCU 1; the MCU 1, after receiving the reference frame refresh request, sends a reference frame image to T1; the remote image of T1 is switched to the image in conference 2, entering conference 2 and starts media conversation.

Before and after the conference switching, the media receiving and sending channel on T1 and the MCU 1 keep unchanged. The media streams on T1 change, originating from conference 1 instead of conference 2. Images may not be interrupted during the switching process.

It should be noted that if the switching request message sent by T1 includes the switching request type information indicating disconnecting from the original conference, the process of switching to conference 2 by sending the reference frame refresh request by T1 specifically refers to: quitting the current conference and receiving and sending the media streams of conference 2 through the media channel of the current conference; if the switching request message sent by T1 includes the switching request type information indicating maintaining the connection with the original conference, the process of switching to conference 2 by sending the reference frame refresh request by T1 specifically refers to: maintaining the current conference, and transmitting the media streams of conference 2 through the new media channel established by the MCU 1.

Step 307: T1 receives, from the MCU 1, a switching indication message indicating that the switching fails, which is to be specific, that the MCU 1 fails to switch to conference 2 according to the switching request type information, or T1 fails to pass a permission verification. Therefore, the process of switching to the destination conference according to the switching indication message and in collaboration with the MCU 1 is specifically: maintaining the status of conference 1, i.e., still staying in conference 1, maintaining the media channel and images in conference 1, including maintaining the signaling and media status unchanged and ending the conference switching process.

In this embodiment, the switching message (including the switching request message, switching response message, and switching indication message) involved in the preceding process can be specifically implemented as follows.

1. In the H.245 protocol (Multimedia Control Protocol), for the switching request message, reference can be made to the definition of the sub-type message NonStandardMessage (non-standard message) in RequestMessage (request message), and the definition of the non-standard field (NonStandardParameter) in NonStandardMessage.

```
NonStandardParameter ::= SEQUENCE
{
    nonStandardIdentifier   NonStandardIdentifier,
    data                    OCTET STRING
}
where NonStandardIdentifier is defined as follows:
NonStandardIdentifier ::= CHOICE
{
    object           OBJECT IDENTIFIER,
    H.221NonStandard           H.221NonStandard,
    ...
}
where H.221NonStandard is defined as follows:
H.221NonStandard ::= SEQUENCE
{ t35CountryCode              INTEGER(0..255),
    t35Extension   INTEGER(0..255),
    manufacturerCode            INTEGER(0..65535),
    ...
}
```

In this embodiment, nonStandardidentifier (non-standard identifier) in NonStandardMessage is filled in H.221NonStandard format. The content filled in H.221NonStandard is: t35ContryCode=0x26, t35Extension=0x00, manufacturerCode=0xt011.

The preceding data is filled in TLV (Type, Length, Value, TVL) format, and reference can be made to the following table:

| Message Description and Message Type Value | Message Meaning | Filed Length | Remarks |
|---|---|---|---|
| Conference site <---> MCU | | | |
| Message ID = 0x0000,0001 | Conference switching request | 4 bytes | |
| Message length | Length of the message | 4 bytes | Length of the request message |
| Request message | | | |

For the content definition of the preceding request message, reference can be made to the following table:

| Items | Filed Description | Remarks Description |
|---|---|---|
| Request Message | Request type (1 byte) Conference site M number (2 bytes) Conference site T number (2 bytes) Alias length of the destination conference (1 byte) Alias of the destination conference (n byte) | Sent by the MCU to the conference site Request type: "0" indicates disconnecting from the original conference after switching. "1" indicates maintaining the connection with the original conference after switching. |

In the H.245 protocol (Multimedia Control Protocol), for the switching response message, reference can be made to the definition of sub-type message NonStandardMessage in ResponseMessage (response message). The content of the non-standard field is as follows:

The basic format of the non-standard field is the same as that of the preceding request message. The specific information format that the data (in the type of OctetString) in the response message applied is the TLV format. For the method of filling the data, reference can be made to the following table:

| Message Description and Message Type Value | Message Meaning | Field Length | Remarks |
|---|---|---|---|
| MCU <---> Conference site | | | |
| Message ID = 0x0000,0002 | Conference switching response | 4 bytes | |
| Message length | Length of the message | 4 bytes | Conference switching response message |
| Response message | | | |

For the content definition of the preceding response message, reference can be made to the following table:

| Item | Field Description | Remarks |
|---|---|---|
| Response message | Result (4 bytes; 0: allow; 1: deny) Cause code (4 bytes) | This message may be either sent by the MCU to the conference site, or sent by the conference site to the MCU. If a result is 1, an error code is read; if a result is 0, an error code is ignored. |

In the H.245 protocol (Multimedia Control Protocol), for the switching response message, reference can be made to the definition of sub-type message NonStandardMessage in IndicationMessage (indication message). The content of the non-standard field is as follows:

The basic format of the non-standard field is the same as that of the preceding request message. The specific information format that the data (in the type of OctetString) in the indication message applied is the TLV format. For the method of filling the data, reference can be made to the following table:

| Message Description and Message Type Value | Message Meaning | Field Length | Remarks |
|---|---|---|---|
| MCU <---> Conference site | | | |
| Message ID = 0x0000,0003 | Switching result indication | 4 bytes | |
| Message length | Length of the message | 4 bytes | Conference switching result information |
| Content of the conference switching result information | | | |

For the definition of the conference information content, reference can be made to the following table:

| Item | Field Description | Remarks |
|---|---|---|
| Indication information | Result (4 bytes; 0: success; 1: failure) Cause code (4 bytes) Conference site M number (2 bytes) Conference site T number (2 bytes) | This message may be either sent by the MCU to the conference site, or sent by the conference site to the MCU. If a result is 1, an error code is read; if a result is 0, an error code is ignored. |

2. In SIP (Session Initiation Protocol, SIP), a switching request/response/indication message may be an INFO/200 OK (or OPTION/200 OK) message. During specific implementation, the non-standard field data defined by using H.323 (Recommendations of Packet-based Multimedia Communication Systems) is coded, and the coded non-standard field data is filled into the BODY of an INFO (notify) message or an OPTION (query) message.

3. In H.281 (Far End Camera Control Protocol), a switching request message is sent by adding a switching request message button or icon on a video image. The attendee makes a response by performing an operation of using a remote-controller on the video image. Such operations may be sent to the MCU by using an FECC (Far End Camera Control, FECC) message. The FECC message is categorized into three types: START ACTION message (start action message), CONTINUE ACTION message (continue action message), and STOP ACTION message (stop action message). The use and formats of these three types of messages have been defined in the standard, which are well known by those skilled in the art and thus not detailed here. The MCU receives the FECC message, and thus can learn the operations that need to be performed.

For example, when a user selects a conference on a television image, the operation of the user is notified to the MCU through the FECC message. The MCU receives the operation of the user through the FECC message, and then performs corresponding processing. If a switching request is received, the switching is performed; if the switching is successful, the image of the destination conference is displayed; if the switching fails, the status of the original conference remains unchanged.

In the method provided in this embodiment, the conference switching process can be started according to the switching request message. Therefore, the process is simple, the connection channel of the original conference does not need to be interrupted, and the remote images of the original conference do not need to be interrupted. This reduces the recalling process during the conference switching and improves the switching speed, thus achieving smooth conference switching, i.e., switching to the remote images of the destination conference while maintaining the remote images of the original conference uninterrupted, and providing good experience for users during the conference switching process.

Embodiment 4

This embodiment provides a method for conference switching. The method relates to a conference terminal side and control side. In this embodiment, the following describes by taking an example of using a conference terminal T1 as the conference terminal side, and using an MCU 1 and an MCU 2 as the control side. For ease of description, the conference where T1 is currently in is the current conference, called the original conference, supposing that the original conference is conference 1; and the conference requested by T1 for switching is called the destination conference, supposing that the destination conference is conference 2. Suppose that conference 1 belongs to the MCU 1 and conference 2 belongs to the MCU 2.

Compared with the Embodiment 3, it should be noted that: the method provided in this embodiment is applicable to a scenario where switching between different conferences on different MCUs is performed. To be specific, the process of conference switching according to the method provided in this embodiment is performed under the condition that conference 1 belongs to the MCU 1 and conference 2 belongs to the MCU 1.

Figure 5:
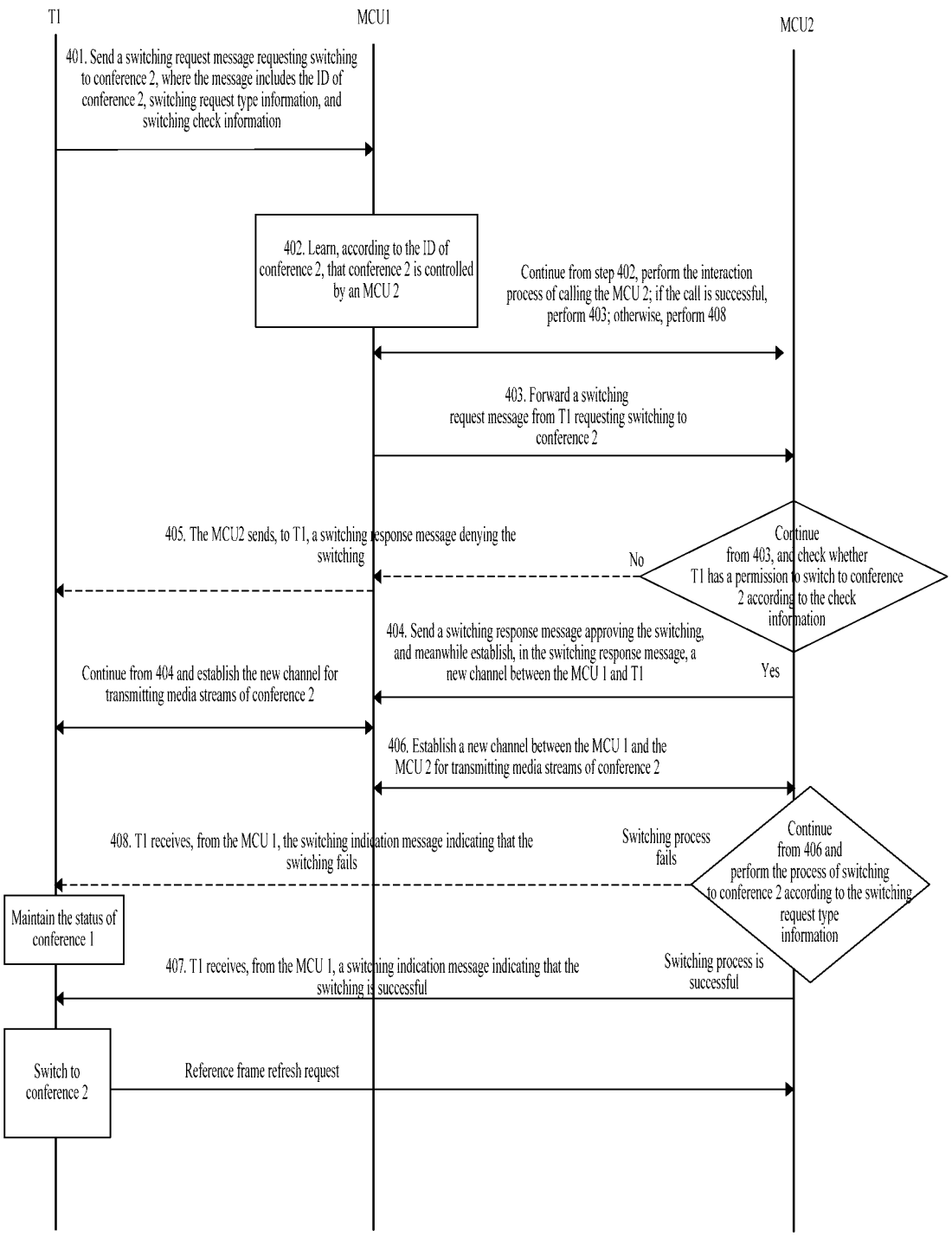
FIG. 5 is a flowchart of a system for conference switching according to Embodiment 4 of the present invention.

As shown in FIG. 5, the method includes as follows:

When terminal T1 is in conference 1, the attendee wants terminal T1 to join in conference 2 as required. In this case:

Step 401: T1 sends, to an MCU 1, a switching request message requesting switching to conference 2, where the switching request message includes the ID of conference 2. Preferentially, in this embodiment, the switching request message further includes switching request type information and switching verification information.

Step 402: The MCU 1 receives the switching request message requesting switching to conference 2, and learns, according to the ID of conference 2, that conference 2 is controlled by an MCU 2. In this case, the MCU 1 initiates a call to conference 2 in the name of T1. If the MCU 1 fails to make the call, step 408 is performed; if the MCU 1 makes the call successfully, step 403 is performed.

In the prior art, each MCU may learn information of its controlled conferences, and information of other conferences controlled by each of other MCUs. Therefore, any of the MCUs can determine, according to such information, whether a conference is controlled by itself, i.e., a local conference or other conferences controlled by other MCUs, remote conferences. In this embodiment, the MCU 1 can also simply learn that conference 2 is controlled by the MCU 2. The method for learning such information is the same as that in the prior art, which is not detailed here.

In addition, the process of initiating a call to conference 2 to the MCU 2 can be performed according to the prior art, which is similar to entering and quitting a conference, and is not detailed here.

Step 403: The MCU 1 forwards, to the MCU 2, the switching request message from T1 requesting switching to conference 2. The MCU 2 verify, according to the switching verification information included in the switching request message, whether T1 has a permission to switch to conference 2. If a verification result indicates that T1 has the permission to switch to conference 2, step 404 is performed; if a verification result indicates that T1 has no permission to switch to conference 2, step 405 is performed.

Step 404: The MCU 2 sends, to the MCU 1, a switching response message approving the switching, and meanwhile establishes, in the switching response message, a new channel between the MCU 1 and T1, so as to transmit media streams of conference 2. The MCU 1, after receiving the switching response message, forwards the switching response message to T1, and establishes the channel for transmitting the media streams of conference 2. Step 406 is performed.

It should be noted that in step 404, the establishing the new channel between the MCU 1 and T1 is implemented in the case where T1 needs to maintain conference 1 with the MCU 1. If T1 does not need to maintain the connection with conference 2, no new channel needs to be established. In this case, after quitting conference 1, T1 maintains the channel that has been established for transmitting media streams of conference 1 and transmits the media streams of conference 2 through the channel.

Step 405: The MCU 2 sends, to T1, a switching response message denying the switching. The MCU 1 forwards the switching response message to T1. T1 may remain in conference 1. T1 fails the verification performed by the MCU 2, therefore, the process ends, and the subsequent steps are ignored.

Step 406: The MCU 2 establishes a new channel between the MCU 1 and the MCU 2 for transmitting the media streams of conference 2. After the channel is established, the process of switching to conference 2 is performed according to the switching request type information. If the MCU 2 performs the switching successfully, the MCU 2 sends the conference site ID, which is allocated to T1 and in conference 2, to the MCU 1. After receiving the conference site ID of T1 (the conference site ID may be an MT number or another unique ID), the MCU 1 sends, to T1, a switching indication message indicating that the switching is successful, updates the information of conference 1, and associates two channels between T1 and the MCU 1, and between the MCU 1 and the MCU 2 so that the media streams of conference 2 may be transmitted to T1 through these two channels. Then, step 407 is performed. If the MCU 2 fails to perform the switching, the MCU 2 sends, to the MCU 1, a switching indication message indicating that the switching fails, and the MCU 1 forwards, to T1, the switching indication message indicating that the switching fails. Then, step 408 is performed.

In step 406, for the process of switching by the MCU 1 to conference 2 according to the switching request type information, references can be made to the operations of MCU 1 in step 305 in the Embodiment 3.

Step 407: T1 receives, from the MCU 1, a switching indication message indicating that the switching is successful, and switches to conference 2. Then, the process of conference switching can be ended.

For the specific operations in step 407, reference can be made to those in step 306 in Embodiment 3. The difference between these two steps lies in that, in step 407, the MCU 1 forwards, to the MCU 2, the I frame sent by T1, and the MCU 2 forwards media streams. That is, the MUC 1 acts as a bidirectional relay between T1 and the MCU 2, and forwards the interaction between T1 and the MCU 2. In this way, T1 can join in the video conference of conference 2 on the MCU 2.

Step 408: T1 receives, from the MCU 1, the switching indication message indicating that the switching fails, maintains the status of conference 1, i.e., still staying in conference 1, and maintaining the media channel and images of conference 1 unchanged. Then, the process of conference switching ends.

For the implementation of the switching messages involved in this embodiment, reference can be made to the implementation of the switching messages in Embodiment 3, which is not detailed here.

The method provided in this embodiment implements conference switching on different MCUs. Therefore, the process is simple, the connection channel of the original conference does not need to be interrupted, and the remote images of the original conference do not need to be interrupted. This reduces the recalling process during the conference switching and improves the switching speed, thus achieving smooth conference switching, and providing good experience for users during the conference switching process.

Embodiment 5

This embodiment provides a method for conference switching when a conference terminal in a first conference is invited by a conference terminal in a second conference to join in the second conference.

In this method, suppose that: on the conference terminal side, the conference terminal which is invited to join in the second conference is T1, and on the control side, an MCU 1 controls the switching process. For ease of description, the conference where T1 is currently in is called the first conference, conference 1, and the conference which T1 is invited to join in is called the second conference, conference 2. Conference 1 and conference 2 both belong to the MCU 1.

Figure 6:
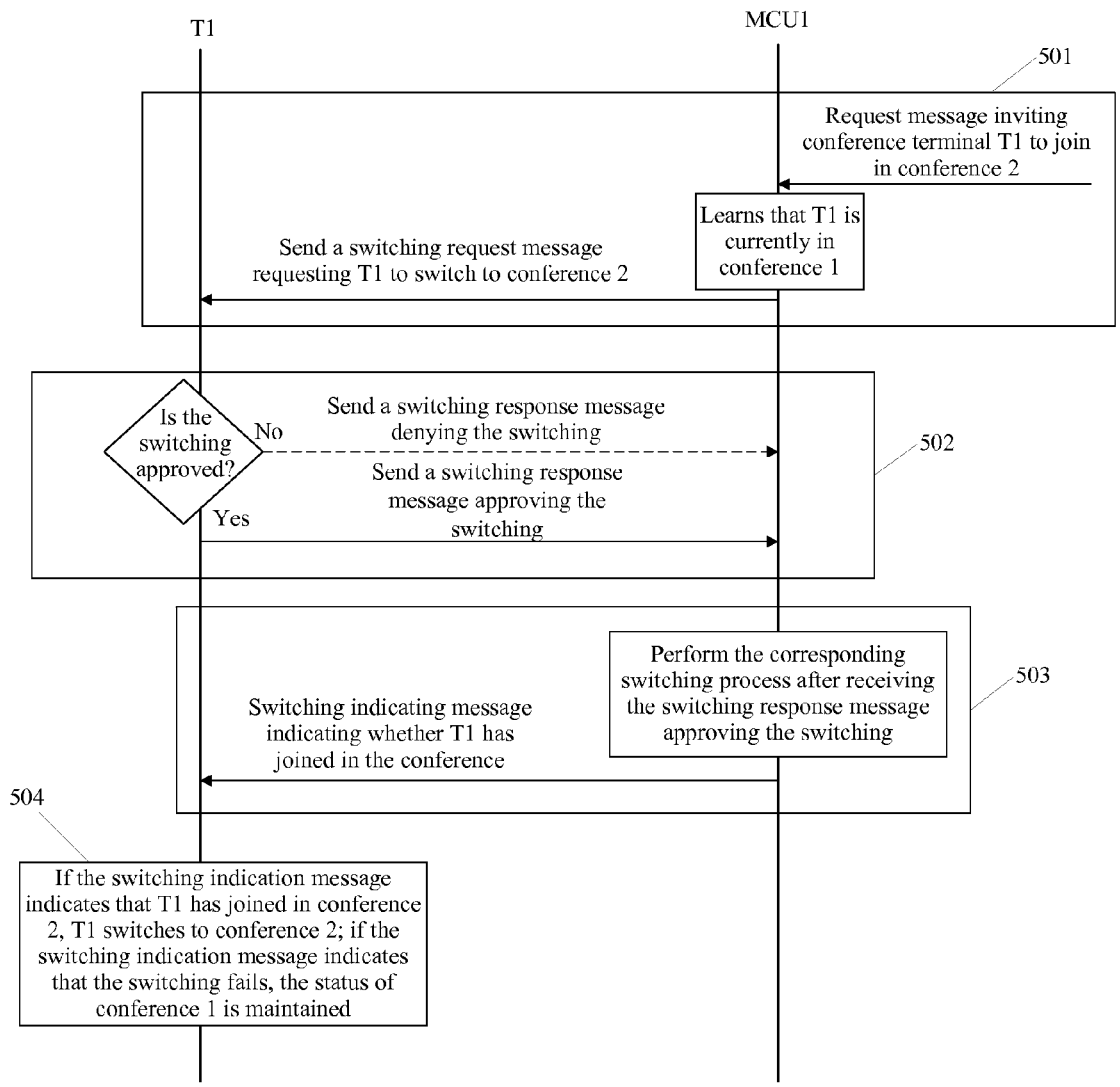
FIG. 6 is a flowchart of a method for conference switching according to Embodiment 5 of the present invention.

As shown in FIG. 6, the method includes as follows:

Step 501: The MCU 1 receives, from a conference terminal, a request inviting T1 to join in conference 2, and determines whether T1 is currently in the first conference. If T1 does not enter any conference, a normal call process can be initiated to call T1 to join in conference 2 according to the prior art, which is not detailed here. If T1 is currently in conference 1, the MCU 1 sends a switching request message to T1, requesting T1 to switch to conference 2.

Step 502: After receiving the switching request message from the MCU 1, if T1 refuses to join in the conference, T1 sends, to the MCU 1, a switching response message denying the switching, and maintains its original status, and stays in conference 1. After receiving, from T1, the switching response message denying the switching, the MCU 1 sends a message to the conference terminal sending the request, indicating that T1 fails to be invited, and then, the switching process ends and the subsequent steps are ignored. If T1 accepts the invitation and desires to join in conference 2, T1 sends, to the MCU 1, a switching response message approving the switching.

Step 503: After receiving, from T1, the switching response message approving the switching, the MCU 1 performs at least the following items:

The MCU 1 allocates a new conference site ID for T1 in conference 2. The conference site ID may be an MT number or another unique ID.

The conference information of conference 2 is updated.

If the preceding two items are performed successfully, a switching indication message indicating that T1 has joined in the conference is sent to T1. The switching indication message includes the allocated conference site ID and the conference information of conference 2. If the processing of any item fails, a switching indication message indicating that the switching fails is sent to T1, and then the process of conference switching ends.

Step 504: After T1 receives the switching indication message from the MCU 1, if the switching indication message indicates that T1 has joined in conference 2, T1 switches to conference 2.

For the process of switching to conference 2, reference can be made to step 306 in Embodiment 3. If the switching indication message indicates that the switching fails, the status of conference 1 is maintained.

In addition, for the implementation of the switching messages involved in this embodiment, reference can be made to the implementation of the switching messages in Embodiment 3, which is not detailed here.

According to the method provided in this embodiment, a conference terminal which is currently in a first conference can smoothly switch to a second conference after receiving a request inviting the conference terminal to join in the second conference. During the entire switching process, the connection channel of the first conference does not need to be interrupted, thus improving the switching speed and enhancing user experience during the processing of joining in the second conference after accepting the invitation.

Embodiment 6

Figure 7:
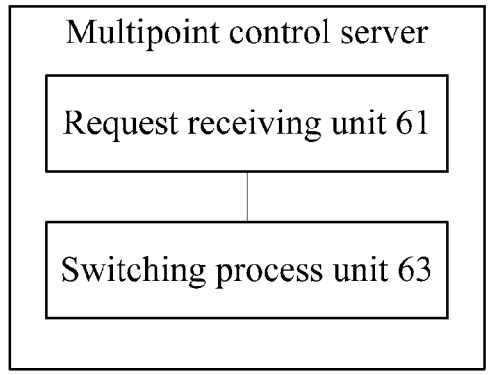
FIG. 7 is a schematic structural diagram of a multipoint control server according to Embodiment 6 of the present invention.

This embodiment provides a multipoint control server, where the multipoint control server may be specifically an MCU device. As shown in FIG. 7, the multipoint control server includes a request receiving unit 61 and a switching processing unit 63.

The request receiving unit 61 is configured to receive, from a conference terminal, a switching request message requesting switching to a destination conference, where the switching request message includes information of the destination conference. The switching processing unit 63 is configured to determine, according to the switching request message, to switch to the destination conference indicated by the information, and perform the process of switching to the destination conference.

Figure 8:
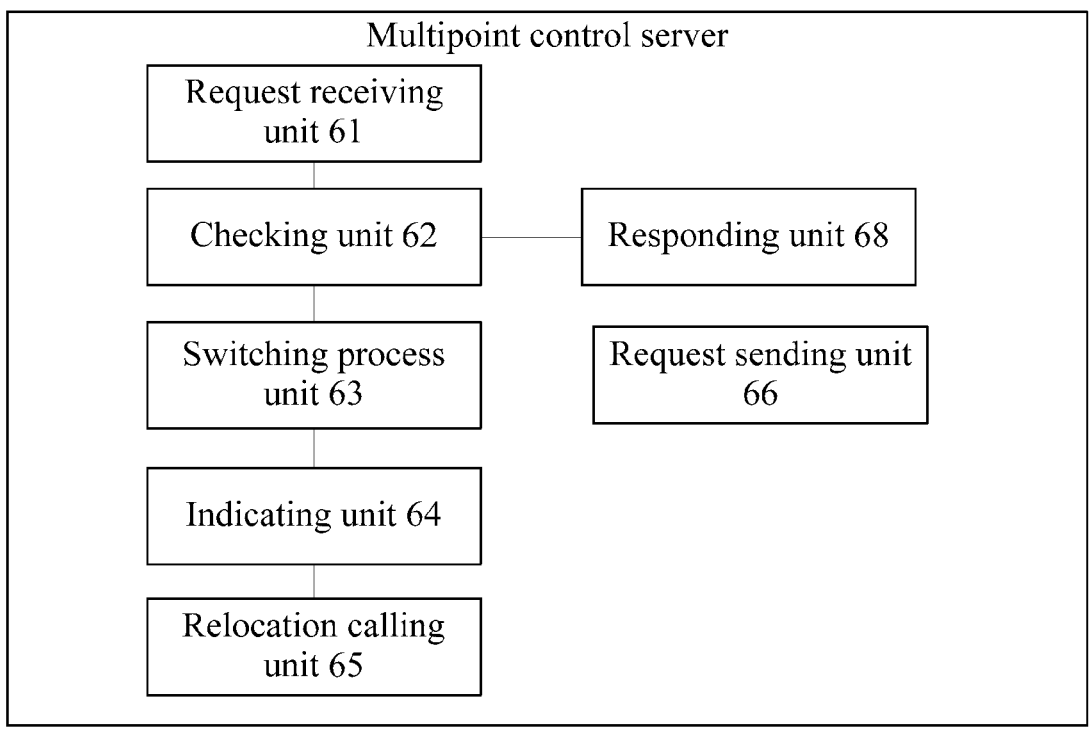
FIG. 8 is a schematic structural diagram of another multipoint control server according to Embodiment 6 of the present invention.

As shown in FIG. 8, an embodiment of the present invention provides a multipoint control server, where the multipoint control server may further include an indicating unit 64.

The indicating unit 64 is configured to send, according to the processing result of switching to the destination conference, a switching indication message to a conference terminal sending the switching request message.

The switching processing unit 63 performs the following operations:

if the switching request type information included in the switching request message indicates disconnecting from an original conference after switching, applying for a new conference site ID for the conference site in the destination conference; adding information of the conference terminal in the destination conference; updating media streams of the original conference to media streams of the destination conference; and updating conference information of the original conference.

Correspondingly, the indicating unit 64 is specifically configured to: when the preceding operations are performed successfully, send, to the conference terminal, a switching indication message indicating that the switching is successful, where the switching indication message includes at least the newly applied conference site ID; and when any one of the preceding operations fails, send, to the conference terminal, a switching indication message indicates that the switching fails.

if the switching request type information included in the switching request message is maintaining the connection with the original conference after switching, the following steps are performed:

searching for the destination conference in a record of active conferences corresponding to the conference terminal; if the destination conference is searched out, performing the process of switching to the destination conference according to the searched-out resource of the destination conference; and if the destination conference is not searched out, configuring a resource for the destination conference, and performing the process of switching to the destination conference according to the configured resource of the destination conference.

Correspondingly, the indicating unit 64 is specifically configured to: when the switching processing unit 63 successfully performs the process of switching to the destination conference according to the searched-out conference resource, send, to the conference terminal, a switching indication message indicating that the switching is successful, where the switching indication message includes at least the searched-out conference site ID; otherwise, send, to the conference terminal, a switching indication message indicating that the switching fails; or when the switching processing unit 63 successfully configures the resource for the destination conference and performs the process of switching to the destination conference according to the configured resource, send a switching indication message indicating that the switching is successful, where the switching indication message includes at least the newly applied conference site ID; otherwise, sends a switching indication message indicating that the switching fails.

In this embodiment, as shown in FIG. 8, the multipoint control server may further include the following optional units: a verifying unit 62, a responding unit 68, a relocation calling unit 65, and a request sending unit 66.

The message received by the request receiving unit 61 may further include switching verification information. Therefore, the verifying unit 62 is configured to verify, according to the switching verification information, whether the conference terminal has a permission to switch to the destination conference indicated by the information; if a verification result indicates that the conference terminal has the permission to switch to the destination conference, switching to the destination conference indicated by the information is allowed. The responding unit 68 is configured to: if the verification result of the verifying unit 62 indicates that the conference terminal has the permission to switch to the destination conference, send, to the conference terminal, a response message approving the switching.

The relocation calling unit 65 is configured to: when the destination conference is not controlled by the local multipoint control server, make a call to a multipoint control server controlling the destination conference.

Correspondingly, the indicating unit 64 is further configured to: if the relocation calling unit 65 makes a successful call, forward the switching request message requesting switching to the destination conference to the multipoint control server controlling the destination conference.

The request sending unit 66 is configured to: if a requested conference terminal is in a first conference after the requested conference terminal receives the request message from a requesting conference terminal for attending the second conference, send the switching request message to the requested conference terminal to request the requested conference terminal to switch to the second conference. Correspondingly, the switching processing unit 63 is further configured to: when receiving, from the requested conference terminal, a switching response message approving the switching, perform at least the following items: allocating the conference site ID in the second conference for the requested conference terminal; and updating conference information of the second conference.

Correspondingly, the indicating unit 64 is further configured to: if the switching processing unit 63 successfully performs the preceding process, send the switching indication message indicating a successful join in the conference to the requested conference terminal, where the switching indication message includes at least the allocated conference site ID.

With the device provided in this embodiment, the conference switching process can be started according to a received switching request message. Therefore, the process is simple, the connection channel of the original conference does not need to be interrupted, and the remote images of the original conference do not need to be interrupted. This reduces the recalling process during the conference switching and improves the switching speed, thus achieving smooth conference switching, i.e., switching to the remote images of the destination conference while maintaining the remote images of the original conference uninterrupted, and providing good experience for users during the conference switching process.

Embodiment 7

Figure 9:
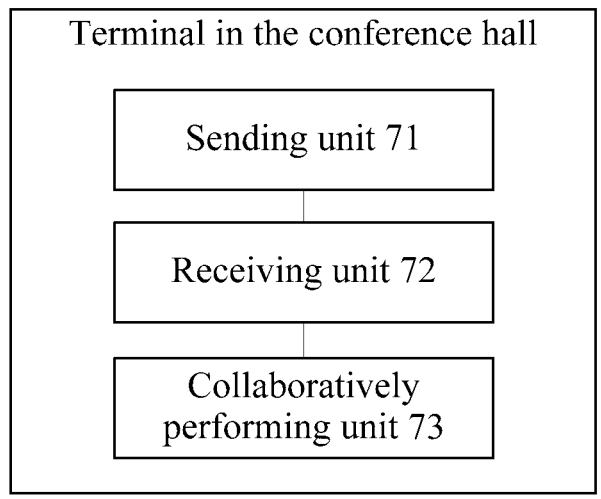
FIG. 9 is a schematic structural diagram of a conference terminal according to Embodiment 7 of the present invention.

This embodiment provides a conference terminal. As shown in FIG. 9, the conference terminal includes a sending unit 71, a receiving unit 72, and a collaboratively performing unit 73.

The sending unit 71 is configured to send a switching message of the conference to a multipoint control server; the receiving unit 72 is configured to receive a switching indication message from the multipoint control server after the sending unit sends the switching request message, where the switching indication message indicates whether the multipoint control server successfully performs the process of switching to the conference; the collaboratively performing unit 73 is configured to switch to the conference according to the switching indication message and under a collaboration with the multipoint control server after the receiving unit receives a switching response message.

Figure 10:
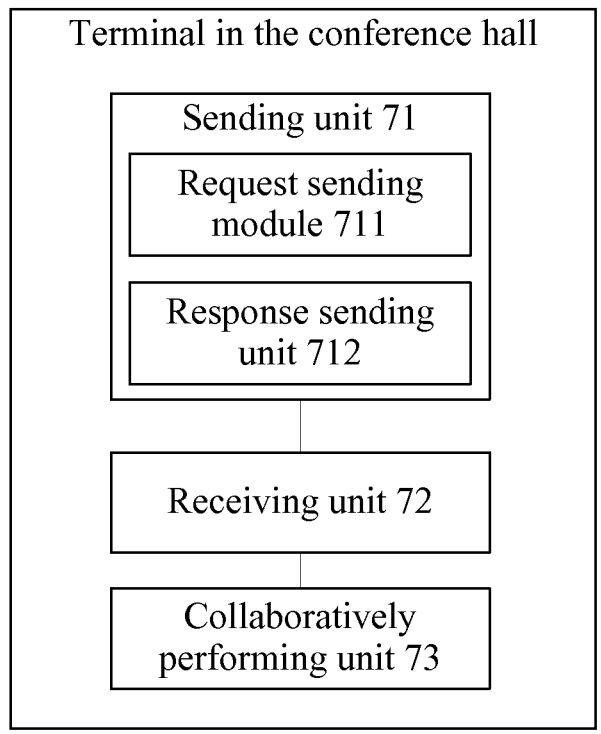
FIG. 10 is a schematic structural diagram of another conference terminal according to Embodiment 7 of the present invention.

As shown in FIG. 10, in another embodiment of the present invention, a conference terminal may further include the following optional modules:

the sending unit including a request sending module 711 and a response sending unit 712.

The request sending module 711 is configured to send the switching request message to the multipoint control server when the terminal actively initiates a process of switching to the destination conference, where the switching request message includes the information of the destination conference.

The response sending unit 712 is configured to: when a requested conference terminal is in a first conference and after the switching request message for attending a second conference is received from the multipoint control server, send, to the multipoint control server, a response message approving the switching.

Correspondingly, the receiving unit 72 is further configured to receive the switching indication message from the multipoint control server after the request sending module sends the request for switching to the destination conference, where the switching indication message indicates whether the process of switching to the destination conference is performed successfully. In this case, the collaboratively performing unit 73 is configured to switch to the destination conference according to the switching indication message and under a collaboration with the multipoint control server.

The receiving unit 72 is further configured to receive the switching indication message from the multipoint control server after the response sending module 712 sends a response message for approving the switching, where the switching indication message indicates whether the multipoint control server successfully performs the process of switching to the second conference. In this case, the collaboratively performing unit 73 is configured to switch to the second conference according to the switching indication message and under a collaboration with the multipoint control server.

In addition, the collaboratively performing unit 73 is specifically configured to update conference information if the switching indication message indicates that the switching is successful, and refreshing the request for switching to the destination conference by sending a reference frame; and maintain the current conference status if the switching indication message indicates that the switching fails.

In addition, the above information of the destination conference may be specifically the ID of the destination conference, and the switching request message may further include the switching request type information.

If the switching request type information indicates disconnecting from an original conference after switching, the collaboratively performing unit 73 is configured to quit the current conference, and receive and send media streams of the destination conference through a media channel of the current conference.

If the switching request type information indicates maintaining the connection with the original conference after switching, the collaboratively performing unit 73 is configured to maintain the current conference, and send media streams of the destination conference through a new media channel created by the multipoint control server.

With the conference terminal provided in this embodiment, the conference switching process can be started by sending the switching request message, without the operation that a conference attendee closes the original conference and open the destination conference. This reduces the recalling process during the conference switching and improves the switching speed, thus achieving smooth conference switching, i.e., switching to the remote images of the destination conference while maintaining the remote images of the original conference uninterrupted, and providing good experience for users during the conference switching process.

Embodiment 8

This embodiment provides a system for conference switching. The system includes a conference terminal and a multipoint control server.

The conference terminal is configured to send a switching message of the conference to a multipoint control server.

The multipoint control server is configured to: when the received switching message is for switching to the destination conference, determine, according to the information of the destination conference included in the switching request message, to switch to a destination conference indicated by the information, and perform the process of switching to the destination conference.

Further, in this embodiment, the multipoint control server is further configured to: when the destination conference requested by the conference terminal for switching is not controlled by the local multipoint control server, make a call to the multipoint control server controlling the destination conference; forward, if the call is successful, the switching request message to the multipoint control server controlling the destination conference; verify, according to switching verification information included in the switching request message, whether the conference terminal has a permission to switch to the destination conference; if a verification result indicates that the conference terminal has the permission to switch to the destination conference send, to the conference terminal, a response message approving the switching; and perform the process of switching to the destination conference according to the switching request type information.

In the system provided in this embodiment, the recalling process during conference switching is reduced. This simplifies the operations during the process of conference switching and improves the switching speed, thus achieving smooth conference switching and providing good experience for users during the conference switching process.

According to the above description of the embodiments, those skilled in the art may easily understand that the embodiments of the present invention can be implemented by using software in combination with necessary hardware. It should be noted that the present invention may also be implemented by using the hardware. However, in most cases, implementation using software in combination with necessary hardware is preferred. Based on such understandings, the technical solutions or part of the technical solutions disclosed in the present invention that makes contributions to the prior art may be essentially embodied in the form of a software product. The software product may be stored in a storage medium such as read only memory (ROM), random access memory (RAM), magnetic disk, or compact disc-read only memory (CD-ROM). The software product includes a number of instructions that enable a device (which may be a laptop computer) to execute the methods provided in the embodiments of the present invention.

In conclusion, the above are merely exemplary embodiments of the present invention. The protection scope of the present invention is not limited thereto. Variations or replacements readily apparent to persons skilled in the prior art within the technical scope of the present invention should fall within the protection scope of the present invention. Therefore, the protection scope of the present invention is subjected to the appended claims.

What is claimed is:

1. A method for conference switching, comprising:
receiving a switching request message requesting switching to a destination conference, wherein the switching request message comprises information of the destination conference;
determining, according to the switching request message, to switch to the destination conference indicated by the information, and performing a switching process to the destination conference; and
sending, according to a result of the switching process to the destination conference, a switch indication message to a conference terminal that sends the switching request message.

2. The method according to claim 1, wherein the switching request message further comprises: switching request type information and switching verification information; and
wherein the determining, according to the switching request message, to switch to the destination conference indicated by the information, and performing the switching process to the destination conference further comprise:
verifying, according to the switching verification information, whether the conference terminal has a permission to switch to the destination conference indicated by the information; and
when a verification result indicates that the conference terminal has the permission to switch to the destination conference, sending, to the conference terminal, a response message approving the switching, and performing the switching process to the destination conference according to the switching request type information.

3. The method according to claim 2, wherein if the switching request type information indicates disconnecting from an original conference after switching, the performing the switching process to the destination conference according to the switching request type information further comprises:
applying for a new conference site ID for the conference terminal in the destination conference; adding information of the conference terminal in the destination conference; updating media streams of the original conference to media streams of the destination conference; and updating conference information of the original conference.

4. The method according to claim 2, wherein if the switching request type information indicates maintaining a connection with the original conference after switching, performing a process of updating to the destination conference according to the switching request type information comprises:
searching for the destination conference in a record of active conferences corresponding to the conference terminal;
performing the switching process to the destination conference according to a searched-out resource of the destination conference, if the destination conference is searched out; and
configuring a resource for the destination conference, and performing the switching process to the destination conference according to a configured resource of the destination conference, if the destination conference is not searched out.

5. The method according to claim 2, wherein when the destination conference requested by the conference terminal for switching is not controlled by a local multipoint control server, the method further comprises:
initiating a call for the local multipoint control server controlling the destination conference;
forwarding, if the call is successful, the switching request message to the local multipoint control server controlling the destination conference; and verifying, by the local multipoint control server and according to the switching verification information comprised in the switching request message, whether the conference terminal has the permission to switch to the destination conference; and
if the verification result indicates that the conference terminal has the permission to switch to the destination conference, sending, to the conference terminal, a response message approving the switching, and performing the switching process to the destination conference according to the switching request type information.

6. The method according to claim 1, wherein after receiving the request message from a requesting conference terminal inviting a requested conference terminal to attend a second conference, if the requested conference terminal is in a first conference, the method further comprises:
sending the switching request message to the requested conference terminal to request the requested conference terminal to switch to the second conference;
if the response message approving the switching is received from the requested conference terminal, performing the following processes:
(a) allocating the conference site ID in the second conference for the requested conference terminal; and updating conference information of the second conference; and
(b) sending the switching indication message indicating a successful join in the conference to the requested conference terminal if preceding processes are successful, wherein the switching indication message comprises at least the allocated conference site ID.

7. A multipoint control server, comprising:
a request receiving unit, configured to receive a switching request message requesting switching to a destination conference, wherein the switching request message comprises information of the destination conference;
a switching processing unit, configured to determine, according to the switching request message, to switch to the destination conference indicated by the information, and perform a switching process to the destination conference; and
an indicating unit, configured to send, according to a result of the switching process to the destination conference, a switching indication message to a conference terminal that sends the switching request message.

8. The server according to claim 7, wherein the switching processing unit performs the following operations:

if the switching request type information comprised in the switching request message indicates disconnecting from an original conference after switching,
- applying for a new conference site ID for the conference terminal in the destination conference;
- adding information of the conference terminal in the destination conference; updating media streams of the original conference to media streams of the destination conference; and
- updating conference information of the original conference;

if the switching request type information comprised in the switching request message indicates maintaining a connection with the original conference after switching,
- searching for the destination conference in a record of active conferences corresponding to the conference terminal;
- performing the process of switching to the destination conference according to the searched-out resource of the destination conference, if the destination conference is searched out; and configuring a resource for the destination conference, and
- performing the switching process to the destination conference according to a configured resource of the destination conference, if the destination conference is not searched out.

9. The server according to claim 7, further comprising:
a relocation calling unit, configured to: when the destination conference is not controlled by the local multipoint control server, make a call to a multipoint control server controlling the destination conference; and
wherein the indicating unit is further configured to: if the relocation calling unit makes a successful call, forward the switching request message requesting switching to the destination conference to the multipoint control server controlling the destination conference.

10. The server according to claim 7, further comprising:
a request sending unit, configured to send the switching request message to a requested conference terminal to request the requested conference terminal to switch to a second conference, if the requested conference terminal is in a first conference after the requested conference terminal receives a request message from a requesting conference terminal inviting a requested conference terminal to attend the second conference;
wherein the switching processing unit, when further configured to receive, from the requested conference terminal, the switching response message approving the switching, performs the following step:
allocating a conference site ID in the second conference for the requested conference terminal; and updating conference information of the second conference.

11. A system for conference switching, comprising:
a conference terminal, configured to send, to a multipoint control server, a switching message for conference switching;
a multipoint control server, configured to: when a received switching message is a switching request message for switching to the destination conference, determine, according to information of the destination conference comprised in the switching request message, to switch to a destination conference indicated by the information, and perform a switching process to the destination conference, and send, according to a result of the switching process to the destination conference, a switch indication message to a conference terminal that sends the switching request message.

12. The system according to claim 11, wherein
the multipoint control server is further configured to: when the destination conference requested by the conference terminal for switching is not controlled by the local multipoint control server, make a call to the multipoint control server controlling the destination conference; forward, if the call is successful, the switching request message to the multipoint control server controlling the destination conference; verify, according to switching verification information comprised in the switching request message, whether the conference terminal has a permission to switch to the destination conference; send, to the conference terminal, a response message approving the switching if a verification result indicates that the conference terminal has the permission to switch to the destination conference; and perform the switching process to the destination conference according to switching request type information in the switching request message.

* * * * *

UNITED STATES PATENT AND TRADEMARK OFFICE
CERTIFICATE OF CORRECTION

| | | |
|---|---|---|
| PATENT NO. | : 8,890,928 B2 | Page 1 of 1 |
| APPLICATION NO. | : 13/707473 | |
| DATED | : November 18, 2014 | |
| INVENTOR(S) | : Zeng | |

It is certified that error appears in the above-identified patent and that said Letters Patent is hereby corrected as shown below:

Title page, item 71

*Under the Applicant:*

Huawei Device Co., Ltd., Guangdong (CN)

should read

Huawei Device Co., Ltd., Shenzhen (CN)

Signed and Sealed this
Twenty-sixth Day of May, 2015

Michelle K. Lee
*Director of the United States Patent and Trademark Office*